(12) United States Patent
Virgilio et al.

(10) Patent No.: US 8,861,308 B2
(45) Date of Patent: Oct. 14, 2014

(54) SIMULTANEOUS JOINT INVERSION OF SURFACE WAVE AND REFRACTION DATA

(75) Inventors: Massimo Virgilio, Milan (IT); Claudio Strobbia, Cairo (GB); Simone Re, Fara Novarese (IT); Michele De Stefano, Soncino (IT)

(73) Assignee: WesternGeco L.L.C., Houston, TX (US)

( * ) Notice: Subject to any disclaimer, the term of this patent is extended or adjusted under 35 U.S.C. 154(b) by 767 days.

(21) Appl. No.: 12/960,703

(22) Filed: Dec. 6, 2010

(65) Prior Publication Data

US 2011/0134722 A1    Jun. 9, 2011

Related U.S. Application Data

(60) Provisional application No. 61/267,223, filed on Dec. 7, 2009.

(51) Int. Cl.
*G01V 1/30*     (2006.01)
*G01V 1/28*     (2006.01)

(52) U.S. Cl.
CPC . *G01V 1/30* (2013.01); *G01V 1/306* (2013.01); *G01V 1/282* (2013.01)
USPC .................. 367/38; 367/36; 367/73; 702/14

(58) Field of Classification Search
USPC .............................. 367/38, 53, 73, 36; 702/14
See application file for complete search history.

(56) References Cited

U.S. PATENT DOCUMENTS

| | | | |
|---|---|---|---|
| 7,330,799 B2 | 2/2008 | Lefebvre et al. | |
| 7,805,250 B2* | 9/2010 | Colombo et al. | 702/14 |
| 8,509,027 B2 | 8/2013 | Strobbia et al. | |
| 2008/0059075 A1 | 3/2008 | Colombo et al. | |
| 2008/0294393 A1 | 11/2008 | Laake et al. | |
| 2009/0070042 A1 | 3/2009 | Birchwood et al. | |

FOREIGN PATENT DOCUMENTS

WO    2008029420 A1    3/2008

OTHER PUBLICATIONS

Schuler, Juerg., "Joint Inversion of surface waves and refracted P- and S- waves", Master of Science Thesis, Dept. of Earth Sciences, Institute of Applied and Environmental Geophysics, sSwiss Federal INstitute of Technology, Aug. 2008.*
Bohlen, et al., "1.5-D Inversion of Lateral Variation of Scholte Wave Dispersion", Geophysics, vol. 69, 2004, pp. 330-344.
Colombo, et al., "Geophysical modeling via simultaneous joint inversion of seismic, gravity, and electromagnetic data: Application to prestack depth imaging", The Leading Edge, Mar. 2007, pp. 326-331.
Colombo, et al., "Near Surface P-velocity modeling by Integrated Seismic, EM, and Gravity Data: Examples from the Middle East", Reservoir Geoscience and Engineering, First Break, vol. 26, 2008, pp. 91-102.
Colombo, et al., "Simultaneous joint inversion of seismic and gravity data for long offset prestack depth migration in Northern Oman", CSPG CSEG Convention, 2007, pp. 191-195.

(Continued)

*Primary Examiner* — Ian J Lobo (57) ABSTRACT

A technique includes a method and apparatus for simultaneous joint inversion of surface wave and refraction data to identify near surface geophysical and geological properties.

19 Claims, 5 Drawing Sheets

(56) References Cited

OTHER PUBLICATIONS

Colombo, et al., "Sub-basalt Depth Imaging Using Simultaneous Joint Inversion of Seismic And Electromagnetic (MT) Data: a CRB Field Study", SEG Annual Meeting, Las Vegas, Nevada, Nov. 9-14, 2008, 5 pages.

Foti, et al., "Some Notes on Model Parameters for Surface wave Data Inversion", 15th EEGS Symposium on the Application of Geophyics to Engineering and Environmental Problems, Feb. 10, 2002, pp. 1-11.

Gallardo, et al., "Joint two-dimensional DC resistivity and seismic travel lime inversion with cross gradient constraints", Journal of Geophysical Research, vol. 109 (B03311), 2004, pp. 1-11.

Grandjean, et al., "2M-SASW: Multifold multichannel seismic inversion of local dispersion of Rayleigh waves in laterally heterogeneous subsurfaces: application to the Super-Sauze earthflow, France", Near Surface Geophysics, vol. 4, 2006, pp. 367-375.

Hayashi, et al., "CMP Cross-Correlation Analysis of Multi-Channel Surface-Wave Data", Exploration Geophysics, vol. 35, 2004, pp. 7-13.

McMechan, et al., "Analysis of dispersive waves by wave field transformation", Geophysics, vol. 46, 1981, pp. 869-874.

Ross, et al., "Characterization of Spatially Varying Surface Waves in a Land Seismic Survey", SEG Expanded Abstract, 2008, pp. 2556-2560.

Schmidt, R.O., "Multiple Emitter Location and Signal Parameter Estimation", IEEE Transactions on Antennas Propagation, vol. 34 (3), Mar. 1986, pp. 276-280.

Shapiro, et al., "High Resolution Surface-Wave Tomography from Ambient Seismic Noise", Science, vol. 307, No. 5715, 2005, pp. 1615-1618.

Socco, et al., "Surface-Wave Method for Near-Surface Characterization: A Tutorial", Near Surface Geophysics, vol. 2, 2004, pp. 165-185.

Strobbia, et al., "Multi-Offset Phase Analysis of Surface Wave Data (MOPA)", Journal of Applied Geophysics, vol. 59, No. 4, 2006, pp. 300-313.

Strobbia, et al., "Surface Waves—Use Them Then Lose Them", 71st EAGE Conference & Exhibition, Amsterdam, The Netherlands, Jun. 8-11, 2009, 5 pages.

Strobbia, et al., "Surface waves: processing, inversion and removal", First Break, vol. 28 (8), 2010, 7 pages.

Xia, et al., "Estimation of Near-Surface Shear Wave Velocity by Inversion of Rayleigh Waves", Geophysics, vol. 64, 1999, pp. 691-700.

Dziewonski, et al., "Numerical analysis of dispersive seismic waves", Methods in Computational Physics: Advances in Research and Applications, vol. 11: Seismology: Survace Waves and Earth Oscillations, B.A. Bold (ed.) Academic Press, 1972, pp. 39-85.

Lai, et al., "Simultaneous Inversion of Rayleigh Phase Velocity and Attenuation for Near-Surface Site Characterization", Georgia Institute of Technology, School of Civil and Environmental Engineering, 1998, pp. 1-155.

International Search Report & Written Opinion issued in PCT/US1010/059088 on Jul. 29, 2011; 9 pages.

\* cited by examiner

SIMULTANEOUS JOINT INVERSION OF SURFACE WAVE AND REFRACTION DATA

CROSS-REFERENCE TO RELATED APPLICATIONS

The priority of U.S. Application Ser. No. 61/267,223, entitled, "Simultaneous Joint Inversion of Surface Wave and Refraction Data", filed Dec. 7, 2009, in the name of the inventors Massimo Virgilio and Claudio Strobbia, commonly assigned herewith, is hereby claimed under 35 U.S.C. §119 (e). This provisional application is also hereby incorporated by reference into this application for all purposes as if set forth verbatim herein.

STATEMENT REGARDING FEDERALLY SPONSORED RESEARCH OR DEVELOPMENT

Not applicable.

BACKGROUND OF THE INVENTION

1. Field of the Invention

This invention relates to data processing for geophysical exploration and is, more specifically, related to simultaneous joint inversion of surface wave and refraction data to obtain the near surface properties in three-dimensional ("3D") and two-dimensional ("2D") seismic surveys.

2. Description of the Related Art

This section of this document introduces various aspects of the art that may be related to various aspects of the present invention described and/or claimed below. It provides background information to facilitate a better understanding of the various aspects of the present invention. As the section's title implies, this is a discussion of "related" art. That such art is related in no way implies that it is also "prior" art. The related art may or may not be prior art. The discussion in this section of this document is to be read in this light, and not as admissions of prior art.

Surface waves are seismic events propagating without radiation towards the Earth's interior, parallel to the surface, with a reduced geometric spreading compared to body waves. In land seismic, they carry large part of the energy radiated by a source at the surface. Surface waves constitute most of the coherent noise in seismic data: they are source generated events characterized by low velocity and high amplitude, and they superimpose on to the useful signal. This coherent noise (often simply called ground roll in land seismic) can be made of different wave types, such as Rayleigh waves, with multiple modes of propagation, Lamb waves, P-guided waves, Love waves, Scholte waves.

The propagation properties of surface waves depend on the elastic properties of the so-called near-surface, the shallow portion of the earth which is responsible of most of the perturbation and degradation of the seismic signals. The accurate identification of the properties of the different surface waves is a crucial point for the design of filters (adapted to the different properties), and can be used for the generation of noise models to be subtracted from data. Moreover, since the propagation properties are closely related to the near surface elastic parameters, the analysis of surface wave allows the near surface characterization. The dispersion curve can be inverted to get a velocity profile as demonstrated in Xia J., et al., "Estimation of near-surface shear wave velocity by inversion of Rayleigh waves", 64 Geophysics 691-700 (1999).

The characterization techniques based on the analysis and inversion of the surface wave properties have been used in different disciplines, from the large scale of the earthquake seismology to the very small scale of ultrasonic non-destructive testing. The surface wave method for the near surface characterization is a three-step process: seismic data are acquired with a linear array of receivers and an in-line source, data are processed to extract the propagation properties, usually the dispersion curve, which is finally inverted to get a single velocity profile associated to one location within the array. A review of the standard approaches is presented by Socco L. V. & Strobbia C., "Surface-wave method for near-surface characterization: a tutorial, Near Surface Geophysics," 165-185 (2004).

The dispersion curve is often extracted tracking energy maxima in 2D wavefield transforms, in which the energy is mapped from T-X domain into F-K, F-V, F-p. Alternative approaches use the phase difference analysis, such as that disclosed in Strobbia C. & Foti S., "Multi-offset phase analysis of surface wave data (MOPA)," 59/4 Journal of Applied Geophysics, 300-313 (2006), and can identify lateral variations.

The use of one-dimensional forward models makes the method essentially 1D, and the propagation properties are usually extracted neglecting lateral variations. However, extensions to 2D have been discussed in the literature. Most of approaches are based on a moving spatial window. See Bohlen T., et al., "1.5-D Inversion of lateral variation of Scholte Wave dispersion", 69 Geophysics, 330-344 (2004); Hayashi K., & Suzuki H., "CMP cross-correlation analysis of multi-channel surface-wave data", 35 Exploration Geophysics 7-13 (2004); Grandjean, G. & A. Bitri, "2M-SASW: Multifold multichannel seismic inversion of local dispersion of Rayleigh waves in laterally heterogeneous subsurfaces: application to the Super-Sauze earthflow, France: Near Surface", 4 Geophysics, 367-375 (2006).

In the field of earthquake seismology, a three-dimensional model of the Earth's crust and upper mantle can be obtained from the observation of Rayleigh and Love wave dispersion in earthquake data. The group velocity is estimated using multiple filter techniques, Dziewonski, A. M. & Hales A. L., "Numerical analysis of dispersive seismic waves," 11 *Methods in computational physics,* 39-85, (B. A. Bolt (ed.) Academic Press 1972), for each source-station path. Alternative approaches can use cross-correlation of ambient noise between couples of stations in a seismic network to estimate the dispersion on interstation paths. Shapiro N. M., et al., "High-Resolution Surface-Wave Tomography from Ambient Seismic Noise," 307 (5715) Science 1615-1618 (2005).

Even if normally only the velocity is considered, the inversion of the attenuation profile is discussed by Lai C. G., "Simultaneous Inversion of Rayleigh Phase Velocity and Attenuation for Near-Surface Site Characterization", Ph.D. Dissertation, Georgia Institute of Technology, p. 370 (1998), who extracts attenuation curves from surface wave data and inverts them with a coupled or uncoupled approach.

An example of investigation of the spatial variation of the Rayleigh wave characteristics in 3D land seismic is reported by Ross W. S., et al., "Characterization of spatially varying surface waves in a land seismic survey," SEG Expanded abstract (2008), the computation of the mean group velocity of Rayleigh wave cross-correlating pairs of signals from adjacent receivers along the same source-receiver azimuth. They estimate a mean attribute of the surface wave between couples of receivers.

Despite some earlier attempts, the systematic application of the surface wave method for entire 3D land surveys, enabled by high quality, broadband point receiver data, is more recent. See, e.g., Strobbia, et al., "Surface Waves: Use Them Then Lose Them", EAGE conference (2009); Strobbia et al, "Surface Waves: Processing, Inversion and Removal", First Break, 28, (2010).

The term "refraction" can be defined as the change in the direction of propagation of a wavefront, or the bending of a ray, as it passes from one medium to another. It is expressed mathematically by Snell's law and is consequence of changes in wavelength and velocity of propagation of a wave. It is produced by differences in refractive indices of the media. "Refracted waves" are also called "diving waves" ("DW") in seismic exploration. Refraction surveys where the incident and reflected angles are critical can be useful for evaluating increasing velocity gradients and locating features that have anomalously high velocities. Currently refraction tomography provides a reliable near-surface velocity model for both structural depth imaging workflows and static corrections for time processing.

The refraction method for the near surface characterization is a three step process: seismic data are acquired with a linear array of receivers and an in line source, data are processed to extract the refraction properties, usually a set of picks of first arrivals on the shot gathers, and then inverted (tomography) to get velocity of the subsurface. The tomography uses refracted first arrivals to compute a near-surface earth model by minimizing the difference between calculated and observed travel times. Because refracted energy samples the near surface with more redundancy and with a greater angular range than reflected waves, it converges robustly to the final velocity model. This approach is used today in land, marine, or OBC environments.

Two-dimensional Simultaneous Joint Inversion ("2D SJI") is today a robust technology for structural imaging in the exploration framework, mainly used to improve the quality of the velocity models used for depth imaging by means of the integration with different domains (Seismic, Gravity, and Electromagnetic). Two different patent submissions are currently running about SJI for integration of seismic and non seismic data for structural imaging. See U.S. Ser. No. 11/829, 551, entitled "Methods and Apparatus for Geophysical Exploration Via Joint Inversion", filed Jul. 27, 2007, and International Patent Application No. PCT/IT2006/000636, entitled "Method for Building Velocity Models for Pre-Stack Depth Migration via the Simultaneous Joint Inversion of Seismic, Gravity and Magnetotelluric Data", filed Apr. 9, 2006.

Beyond the algorithm, this requires integrated workflows across traditionally distinct geophysical domains; the SJI approach collects the equations of different domains, sets the links between the models, and inverts for the unknowns using a proper merge of different residuals. The algorithm inverts for all models providing updates for different domains.

The data to be minimized consist of residuals from multiple geophysical domains, cross parameter constraints (empirical, physical, statistical), and external a-priori constraints (e.g., geometrical relations). The objective function for the SJI problem contains the models of different geophysical domains (the unknowns), the data residuals, the single domain regularization and the links, that are simply the constraints between the domains involved.

These terms are relatively weighted to each other and so the structural similarity among models can be weighted more than the relations among parameters (or vice-versa). Constraints (e.g., well logs or geological information) are honored throughout the inversion.

The present invention is directed to resolving, or at least reducing, one or all of the problems mentioned above.

SUMMARY OF THE INVENTION

The present invention is a computer-implemented technique for use in geophysical exploration and is, more specifically, related to a processing technique including simultaneous joint inversion of surface wave and refraction data to obtain the near surface properties in three-dimensional ("3D") and two-dimensional ("2D") seismic surveys.

Thus, in one aspect, the invention includes a computer-implemented method for use in exploring a subsurface geological formation, comprising: extracting the surface and refracted wave properties from a set of seismic data representing the subsurface geological formation; and simultaneously and jointly inverting the extracted surface and refracted wave properties to estimate the visco-elastic shear and compressional parameters in the near surface.

In another aspect, the invention includes a program storage medium encoded with instructions that, when executed by a computing device, performs a method such as that described above.

In yet another aspect, the invention includes a computing apparatus programmed to perform such a method.

The above presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The proposed method allows the estimation of the near surface properties in 3D and 2D seismic survey by inverting jointly the surface wave and the refracted wave properties. The approach used herein consists of the integration of the surface wave method in the general data processing workflow for 3D data. The analysis stage involves creating first a smooth spatial distribution of the propagation properties and then a detailed high-resolution image of the dispersive and dissipative properties of the surface wave modes.

Both the wave types can be analyzed and processed, with different techniques, to characterize the near surface, for instance to correct for the distortion that the near surface induces on the deeper image. Refraction techniques have been traditionally used, for example for the computation of static corrections or shallow depth imaging, while surface wave methods have been introduced more recently in the data processing workflow. Surface waves and refracted waves are normally present in surface seismic data, acquired with sources and receivers close to the Earth's surface. The two events have different characteristics and their joint use offers several synergies.

The seismic surface waves are more sensitive to the shear elastic parameters (velocity and attenuation) and their properties can be inverted to get, for example, a near surface distribution of the shear wave velocity. On the contrary, the first arrivals are in general associated with P-wave refracted path, and the inversion of the refracted wave properties can generate, for instance, a near surface distribution of the compressional velocity. In typical surface seismic acquisition geometries, the investigation depth of refraction based techniques tends to be larger, while SW gives a higher resolution in the shallow portion. Surface wave methods are moreover more robust with respect to complex shallow structures, such as velocity inversions and hidden layers. At the same time, the surface waves are not affected by scarce penetration of the energy, a typical problem of the refraction propagations through vertical inversions of velocity.

The joint use of surface wave based techniques and refraction methods have hence several advantages. The two datasets are largely independent, even if extracted from the same acquisition of seismic data, and more importantly the two techniques do not have the same geophysical limitations.

The two methods can complement each other for a complete and robust near surface characterization. A joint interpretation can exploit only part of the benefits, while the proposed simultaneous joint inversion uses all the available data and prior information for the determination of the elastic parameters of the near surface. Moreover, the joint inversion does not require a priori assumption about the Poisson ratio in the surface wave inversion.

Figure 1:
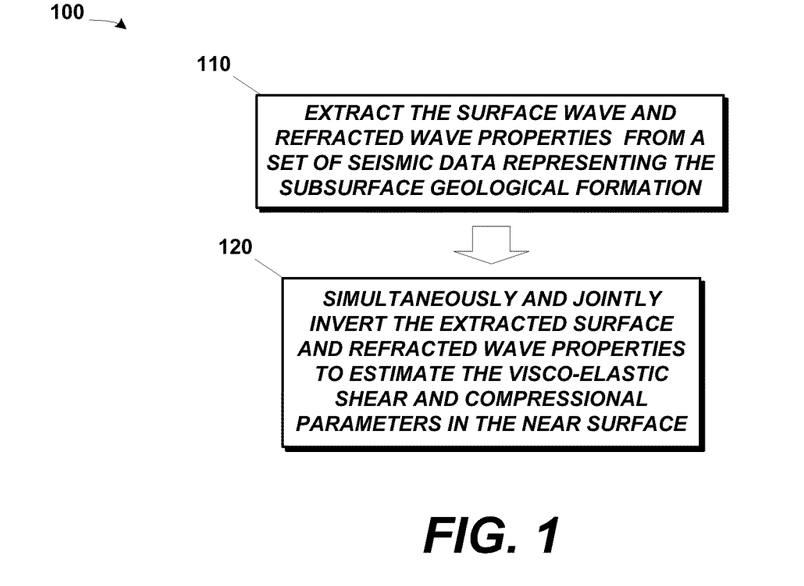
FIG. 1 illustrates one embodiment of a computer-implemented method in accordance with one aspect of the present invention.

The method 100, as illustrated in FIG. 1, comprises of two stages 110, 120. Firstly, at 110, a single set of seismic data is processed to extract both the surface and refracted wave properties. Secondly, at 120, these properties are simultaneously and jointly inverted to estimate the (visco-) elastic parameters (shear and compressional) in the near surface.

The surface wave properties estimation can include the dispersion of the surface wave modes, their attenuation and frequency response. The refracted wave properties include the travel-time for each pair of source and detector, as well as the amplitude and wavelet information.

In one implementation, the processing stage can involve the extraction of first break travel time for all pairs source-detector in a survey and the estimation of modal dispersion curves for all locations within the survey area simultaneously.

The data are analyzed to define the optimal model parameterization, for example the size and discretization of the domain. The prior information (geological, petrophysical etc.) is formalized in terms of constitutive relationships and links between the two domains, and a-priori information used in the workflow.

The inversion stage consists of an optimization problem, where unknown near surface elastic properties are estimated matching modeled data to the extracted wave properties, and considering mutual and spatial correlation for both domains.

In a single-domain approach, the surface wave and refraction properties would be inverted separately, and in case, just at the end of the inversion phase, they would be interpreted jointly. The proposed technology inverts for surface and refraction properties simultaneously, providing a consistent and integrated parameterization obtained at inversion level, and therefore an improved workflow in terms of integration.

The novelty of the method is the complete integration of surface waves and refracted waves in terms of data and of inferred models, and the applicability to 3D large scale surveying.

The proposed method aims obtaining the spatial distribution of the elastic properties ($V_p$, $V_s$, attenuation) from seismic data with general 3D acquisition geometries, inverting jointly the properties of the surface waves and of the refracted compressional waves.

The recorded seismic data are processed to extract the propagation properties of the two wave phenomena, the surface waves and the refracted compressional waves. For the surface waves, multimodal dispersion and attenuation can be extracted from data with 3D geometries for the whole survey area covered with sources and detectors. For refracted data, the travel time and wavelet properties can be extracted for each source-detector pair.

The two dataset are then jointly inverted, merging into a single optimization problem the data misfits and the spatial and mutual correlation. SJI provides here the benefit for the integration, inverting for the first time $V_p$ and $V_s$ parameters together, within one unique cost function. The difference from existing approaches is that the surface wave and the refracted wave properties are inverted simultaneously and on different grids, to get a unique and consistent near surface model and not simply interpreting jointly after independent inversions. This approach has never been used to jointly invert surface and refraction waves.

Figure 2:
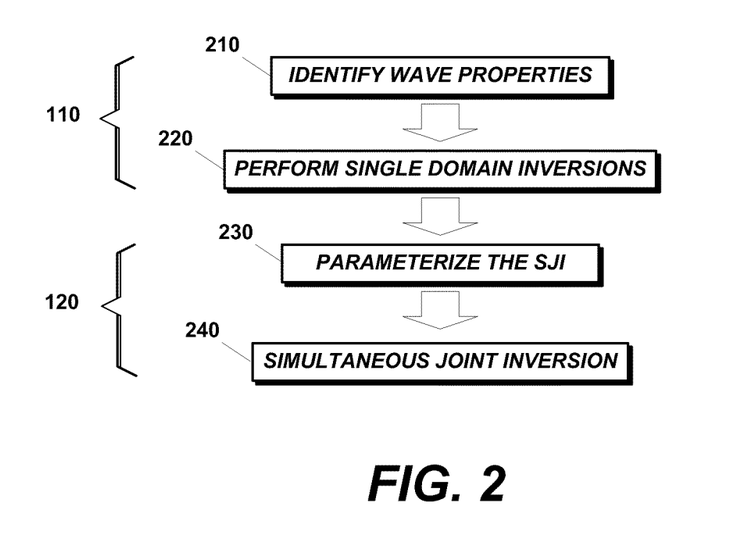
FIG. 2 illustrates one particular implementation of the embodiment of FIG. 1.

The method 100, of FIG. 1, can, in one particular embodiment, be broken into four main stages, as shown in FIG. 2. First, the wave properties are identified (at 210). Seismic data is processed to extract the properties of the considered wave phenomena. The dispersion and attenuation curves are extracted continuously within the survey area, the first break ("FB") and the FB wavelet attributes are extracted for all pairs of sources and detectors of interest. This is followed by single domain inversions (at 220). The two data sets, or subsets of them corresponding to selected areas of interest, are first inverted independently. The results are compared and analyzed jointly, to evaluate their spatial and mutual correlation, to assess the sensitivity and limitations of the techniques for the area of study, and to validate and calibrate the links between the petrophysical parameters.

This is followed by parameterization (at 230) of the simultaneous joint inversion ("SJI"). From the comparison of the single domain inversions and the a priori geological and geophysical information, the parameters of the SJI are determined and tuned for the particular application. The properties of the grids for the two forward problems, the regularizations and the physical links with the relative weights must be defined before proceeding with the SJI iterations. This is then followed by the simultaneous joint inversion (at 240). The experimental data are input to a joint optimization problem which estimates a unique near surface elastic model. A single cost function is created, incorporating a collection of different misfits functions for the data and the link between the domains, relating the petrophysical parameter or the spatial gradients.

To further an understanding of the present invention, one particular implementation of the method described above will now be described relative to FIG. 3. The example provided shows, for simplicity and so as not to obscure the present invention, the case of the simultaneous joint inversion of surface wave dispersion and refraction first breaks, for a 2D line. This does not constitute a general limitation of the method since the workflow works properly also for 3D applications.

Figure 3:
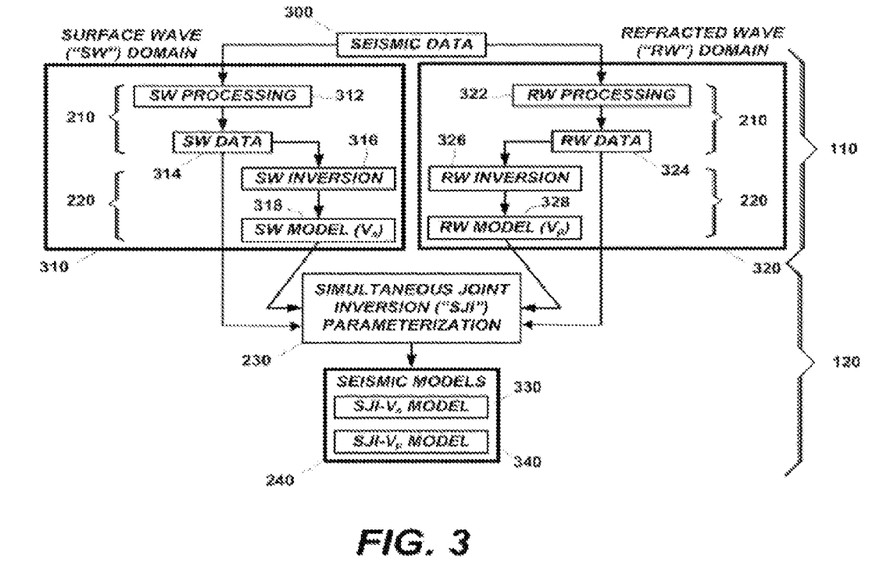
FIG. 3 is a block diagram of one particular embodiment of the present invention.

The illustrated implementation begins with a set of previously acquired seismic data 300. Because the seismic data 300 is previously acquired, it could be legacy data in some embodiments. It may also be acquired relatively contemporaneously and collected for processing at another location. This will be the typical scenario. The invention is not limited by the temporal relationship between acquisition and processing. The seismic data 300 may be acquired in any suitable manner known to the art. For example, the seismic data 300 may be acquired through either a land survey or a seabed survey. In a seabed survey, the seismic data may be multi-component data or just pressure data.

Returning now to the implementation of FIG. 3, the seismic data 300 then undergoes processing in both the surface wave domain 310 and the refracted wave domain 320. In both the surface wave domain 310 and the refracted wave domain 320 the wave properties are identified (at 210) and the single domain inversions (at 220) are performed. The results of the single domain processing 310, 320 are then used in the parameterization (at 230) and simultaneous joint inversion (at 240).

Figure 4A:
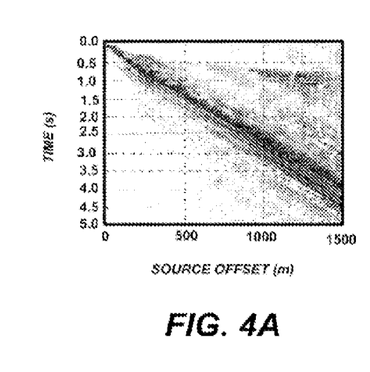
FIG. 4A-FIG. 4B present an analysis of a shot gather to identify coherent noise modes.
Figure 4B:
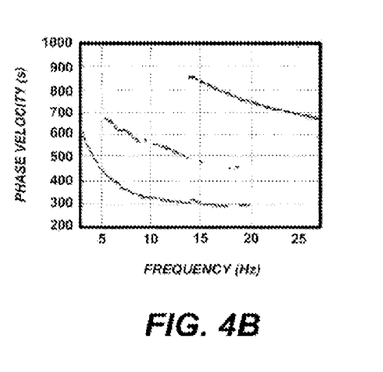
Figure 5:
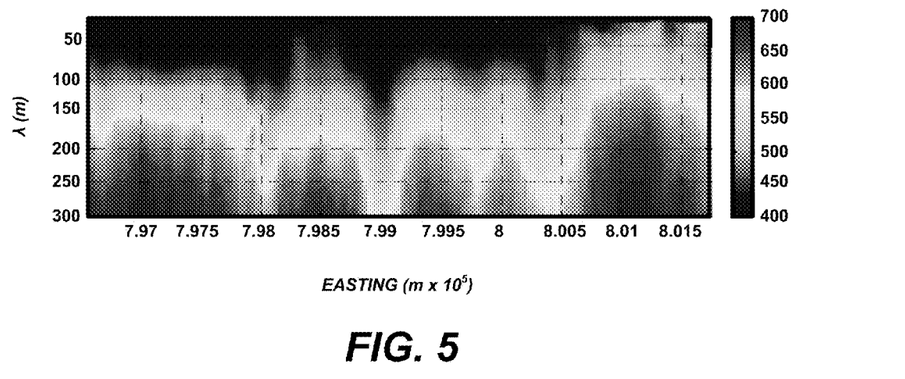
FIG. 5 is an exemplary, continuous distribution of the phase velocity of the fundamental mode for a 2D line (surface wave velocity pseudosection), in which the vertical axis is the SW wavelength, the horizontal axis the position along the line, the color scale the phase velocity.

Turning now to the surface wave domain processing 310, the wave properties are first identified (at 210). Some shot gathers spanning a large offset range are selected, in order to analyze and classify the near surface modes, with special care to the presence of multiple modes, their phase velocity and attenuation. Shot gathers can be analyzed using wavefield transforms such as f-k, followed by tracking of energy maxima. Events are identified, and the subsequent processing workflow is set-up. FIG. 4A-FIG. 4B are examples of shot gather and modal curves. The complete processing workflow extracts the dispersion curves and attenuation curves for the different surface wave modes present in the data, continuously within the survey area. An example of Rayleigh wave fundamental mode phase velocity along a receiver line is provided in FIG. 5.

Modern processing techniques enable the identification of lateral velocity variation with 3D geometries used in large scale reflection seismic surveying. See U.S. Provisional Patent Application Ser. No. 61/118,317, entitled "Continuous Surface Wave Analysis in 3D Data", filed Nov. 26, 2008, in the name of the inventors Claudio L. Strobbia and Anna Glushchenko, and commonly assigned herewith; U.S. patent application Ser. No. 12/620,941, entitled "Continuous Adaptive Surface Wave Analysis for Three-Dimensional Seismic Data", filed Sep. 18, 2009, in the name of the inventors Claudio L. Strobbia and Anna Glushchenko, and commonly assigned herewith. This processing 312 yields a set of surface wave data 314.

Figure 6A:
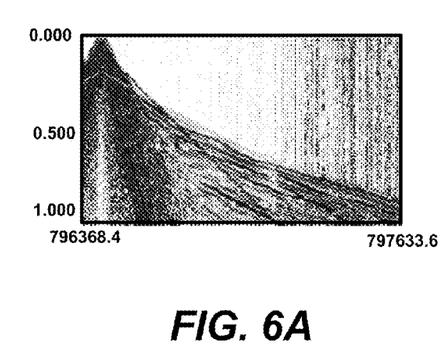
FIG. 6A and FIG. 6B to illustrate an exemplary shot gather and picked first break travel times, respectively.
Figure 6B:
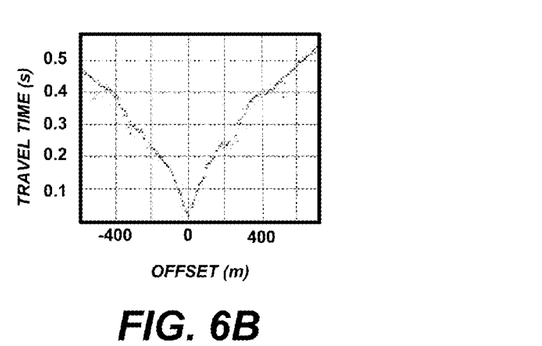
Figure 7:
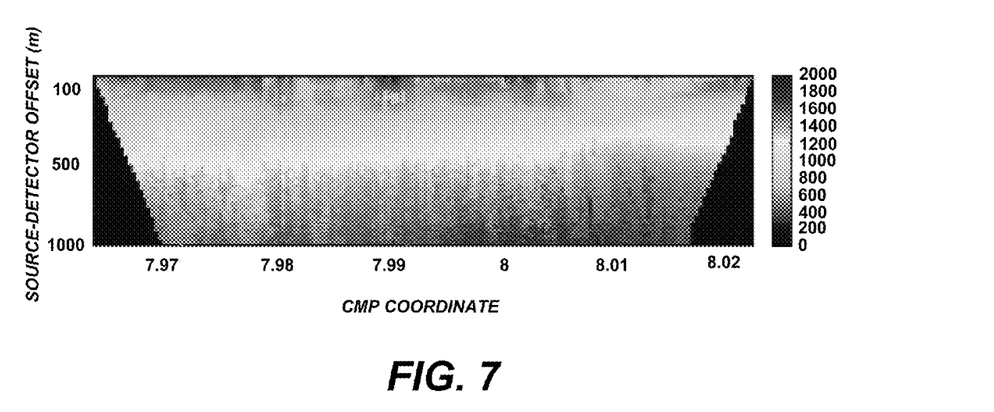
FIG. 7 is an exemplary representation of refracted first-break wave travel time for a full 2D line.

The refracted wave domain processing 320 extracts the refracted wave properties after pre-processing and data conditioning in a manner known to the art. The first break travel-time, the peak amplitude, the spectral properties of the wavelet can be extracted. In FIG. 6A and FIG. 6B a shot gather and the first-break travel-times extracted via first break picking are depicted. Within a survey, the refracted wave properties are extracted for all source-detector pairs. As an example, in FIG. 7 the picked first-break travel times for the considered 2D line are represented in terms of CMP location (horizontal axis), source-detector offset (vertical axis) and tangent velocity (gray scale). This processing 322 yields a set of surface wave data 324.

Figure 8A:
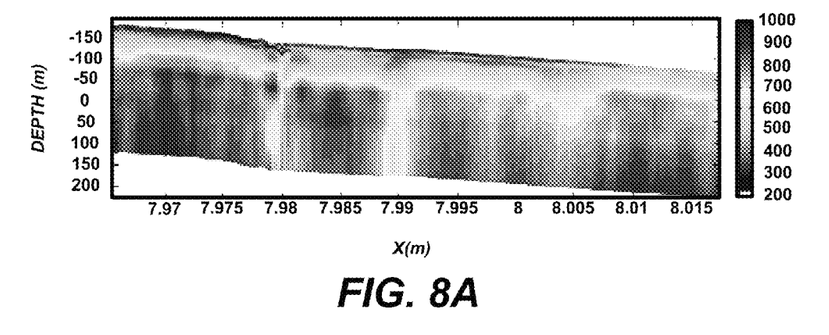
FIG. 8A-FIG. 8B illustrate two independent inversions for the same 2D line, FIG. 8A representing the shear wave velocity section obtained with the surface wave dispersion inversion and FIG. 8B representing the compression wave velocity section obtained via refracted travel time inversion.
Figure 8B:
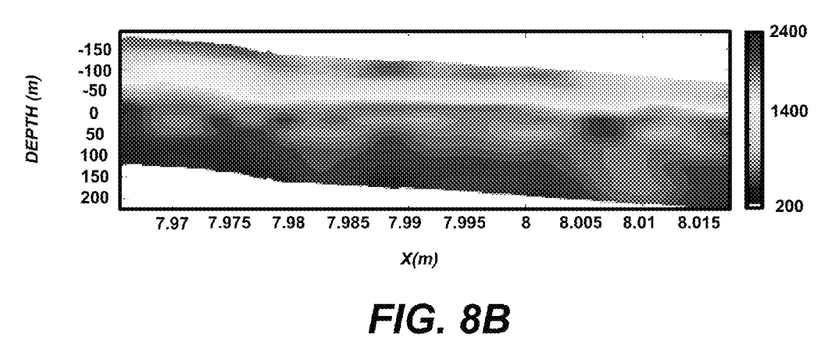
Figure 9A:
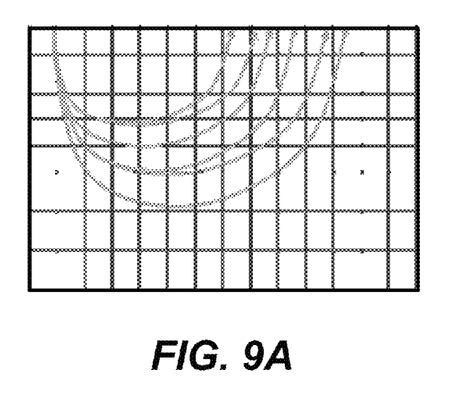
FIG. 9A-FIG. 9B are sketches of the grids for the refraction and surface wave forward models.
Figure 9B:
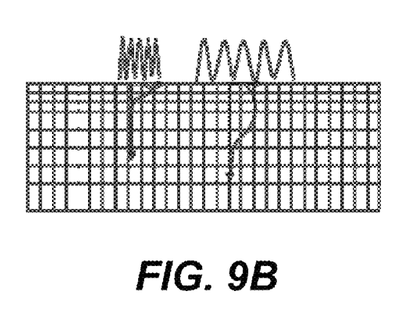

The two datasets 314, 324 are inverted independently (at 220) before being used within the SJI framework. The surface wave inversion 316 provides a shear wave velocity model 318, and a shear wave attenuation model (not shown). The refraction inversion 326 provides a compressional wave velocity model 328 and a compressional attenuation model (also not shown). The resolution of the two inverted models 318, 328 is assessed; the depth of investigation is evaluated considering the model covariances as well as respectively the Rayleigh wave eigenfunctions and the refraction illumination or ray coverage. The relationship between the different physical parameters is observed and mapped, to evaluate the validity of assumed petrophysical relationships. FIG. 8A-FIG. 8B depict the two single domain inversions for the example 2D line.

Following the single domain processing 310, 320, the technique embarks upon parameterization of the simultaneous joint inversion (at 230). The geometries of the SJI iterations (i.e. the grid dimension and extension, the position and the padding) come from the single domain investigations and inversions and are derived from the resolution of the separate domains. Thus, in the SJI inversion, Vs and Vp are resolved on different grids according to their specific resolution. The SJI parameters to be defined for each SJI iteration include the regularization, the links, and the weights.

As to the regularization, the regularization weight coming from the single domain analysis is generally too high since each refraction domain acts as regularization for the $V_s$ inversion (and vice versa). Therefore it is reduced and properly tuned for the specific application. As to the links, $V_p$ and $V_s$ have a common pattern in the shallow subsurface (see FIG. 8A-FIG. 8B) and so the geometrical link forcing the $V_p$ and $V_s$ to be inverted with similar shapes and variations is precious. At the same time, the general empirical equation $V_p=1.7 V_s$ is used as empirical constrain within the cost function. And, as to the weights, refraction and surface wave domain have the same weight, the empirical law is weighted the double when compared with the geometrical link.

The parameterization (at 230) is then followed by the simultaneous joint inversion (at 240) that extracts a unique SJI-$V_s$ model 330 and unique SJI-$V_p$ model 340, combining the information of the two datasets. SJI improved the quality of the sections, defining better the near surface features and resolving the shallow anomalies. The workflow proceeds iteratively with a global tomography approach, which is inverting all the refraction residuals together as opposite of the layer stripping approach. The total number of iterations of SJI to obtain the final $V_p$ and SJI-$V_s$ models is in general lower than 10.

The near surface velocity volume combines the greater penetration of refraction data with the higher vertical and lateral resolution of surface waves in the shallow section. In the example shown herein, thin and sub-vertical low velocity fault zones (see FIG. 8A-FIG. 8B) can be resolved better with the contribution of SW. Similarly happens when shallow velocity inversions affect the effectiveness of refraction in that part of the model.

At the same time, the final SJI-$V_p$ model 340 (incorporating both RW and SW data) can be used directly to compute parameters for the data processing. The SJI-$V_p$ model 340 has been used to compute the time statics on the seismic data that now show an improved continuity and a better stacking power on the main events of the first few hundreds meters.

The technique presented herein allows obtaining a near surface model using all the information in seismic record, merging in a rational manner the contribution of surface wave and refracted waves. Surface and refracted waves provide different advantages to the near surface investigation; the resolution, the penetration and therefore the depth range of investigation are different; merging refracted and surface waves properly means taking benefits from both of them and thus having a better definition of the shallow subsurface parameters.

Surface wave methods are robust and offer high vertical and lateral resolution in the shallow near surface, without suffering from the intrinsic limitations of refraction methods (hidden layer, velocity inversions etc.). At the same time, the investigation depth can be insufficient for some applications, and the refraction techniques provide deeper models, giving directly the P-wave information that can be used in the data processing workflow, for statics and velocity modeling for example, without the need of conversion. In land data, refraction techniques can be challenging in areas with a complex near-surface, in presence of velocity inversions for instance. The data quality is more critical for refraction data, especially on land where picking the near-offset can be challenging.

The combination of the two techniques has therefore several synergies, which can be exploited using the simultaneous joint inversion. The resolution and robustness of surface wave data is able to resolve better the shallow part of the model, and to solve the critical cases of complex near surface. The refraction extends the investigation depth and provides the direct P-wave information which is essential to use the near surface model in the reflection data processing workflow. The joint inversion will also contribute to improve the shear wave model reliability with Poisson's ratio anomalies: in these cases, the a priori assumption of the Poisson ratio may lead to model errors, Foti S., & Strobbia C., "Some Notes on Model Parameters for Surface Wave Data Inversion", Proc. SAG-EEP, Las Vegas, USA, 11 pp. (2002), and the use of the refraction data avoids this pitfall.

The obtained model allows a lithological classification of the near-surface, and a more reliable estimation of other physical and petrophysical parameters, such as the absolute or relative mass density, used for instance in full wave inversions, elastic seismic migrations, and similar applications.

Those in the art will appreciate that the processing technique disclosed above will be computer-implemented. Indeed, the processing is so involved and the data so voluminous that it will not be practiced without a computer. The processing will in fact by performed by some type of software executed by which a computing apparatus is appropriately programmed. The nature of the software—i.e., whether it is an application, a utility, or some other type of software—is not material. Similarly, the nature of the computing apparatus is also not material, although the data is typically voluminous and therefore a high degree of computing power will typically be desirable. The present invention nevertheless admits wide variation in the implementation of the computing aspects of any given embodiment.

Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities that will physically transform the particular machine or system on which the manipulations are performed or on which the results are stored. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Furthermore, the execution of the software's functionality transforms the computing apparatus on which it is performed. For example, the data will reside on some type of program storage medium and will be transformed upon execution of the process. This will then physically alter the content of the program storage medium. The physical alteration is a "physical transformation" in that it changes the physical state of the storage for the computing apparatus. Thus, those skilled in the art will understand the execution of the processing technique to physically transform the computing apparatus on which it is performed.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 10:
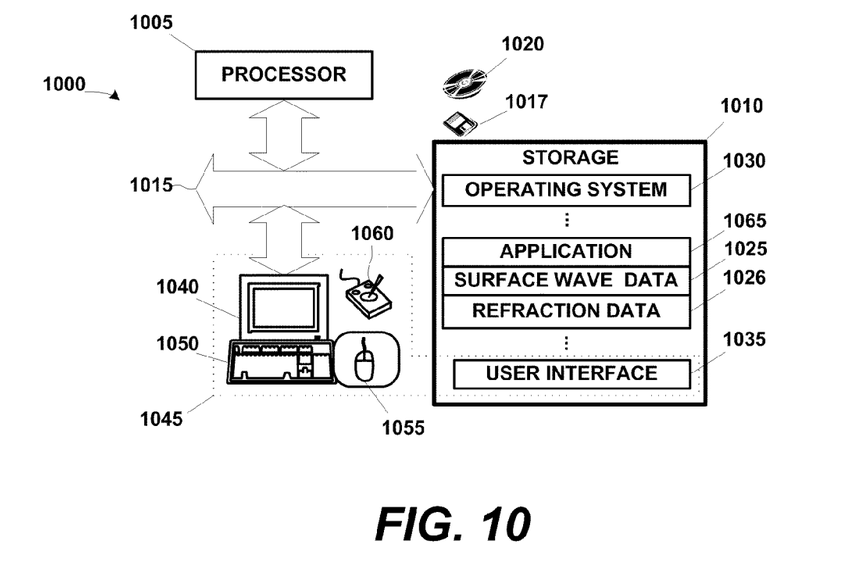
FIG. 10 shows selected portions of the hardware and software architecture of a computing apparatus such as may be employed in some aspects of the present invention.

FIG. 10 shows selected portions of the hardware and software architecture of a computing apparatus 1000 such as may be employed in one particular embodiment of some aspects of the present invention. The computing apparatus '000 includes a processor 1005 communicating with storage 1010 over a bus system 1015. The storage 1010 may include all manner of program storage media such as a hard disk and/or random access memory ("RAM") and/or removable storage such as a floppy magnetic disk 1017 and an optical disk 1020.

The storage 1010 is encoded with surface wave data 1025 and refraction data 1026. The surface wave data 1025 and refraction data 1026 are acquired as discussed above. The storage 1010 is also encoded with an operating system 1030, user interface software 1035, and an application 1065. The user interface software 1035, in conjunction with a display 1040, implements a user interface 1045. The user interface 1045 may include peripheral I/O devices such as a keypad or keyboard 1050, a mouse 1055, or a joystick 1060.

The processor 1005 runs under the control of the operating system 1030, which may be practically any operating system known to the art. The application 1065 is invoked by the operating system 1030 upon power up, reset, or both, depending on the implementation of the operating system 1030. The application 1065, when invoked, performs the method of the present invention as described above. The user may invoke the application in conventional fashion through the user interface 1045.

Note that there is no need for the surface wave data 1025 and refraction data 1026 to reside on the same computing apparatus 1000 as the application 1065 by which it is processed. Some embodiments of the present invention may therefore be implemented on a computing system, e.g., the computing system 1100 in FIG. 11, comprising more than one computing apparatus. For example, surface wave data 1025 and refraction data 1026 may reside in a data structure residing on a server 1103 and the application 1065 by which it is processed on a workstation 1106 where the computing system 1100 employs a networked client/server architecture. Furthermore, although the surface wave data set 1026 is shown residing on the server 1103, there is no requirement that surface wave data 1025 and refraction data 1026 reside together.

Figure 11:
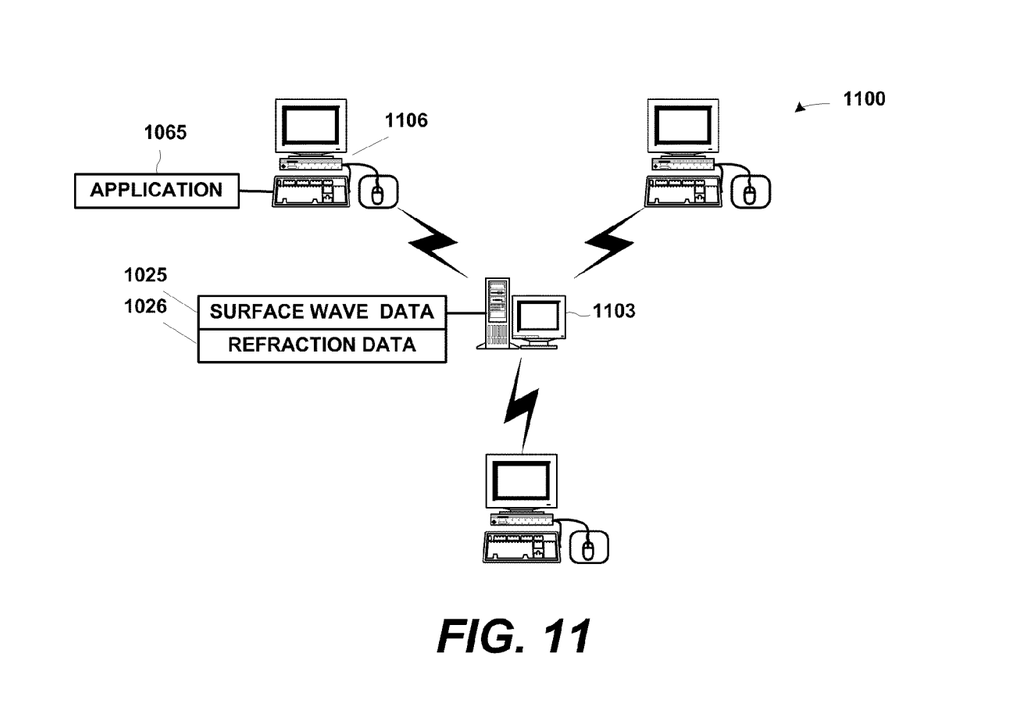
FIG. 11 illustrates a computing system on which some aspects of the present invention may be practiced in some embodiments.

There also is no requirement that the computing system 1100 be networked. Alternative embodiments may employ, for instance, a peer-to-peer architecture or some hybrid of a peer-to-peer and client/server architecture. The size and geographic scope of the computing system 1100 is not material to the practice of the invention. The size and scope may range anywhere from just a few machines of a Local Area Network ("LAN") located in the same room to many hundreds or thousands of machines globally distributed in an enterprise computing system.

In some contexts the apparatus is described as being "capable of" performing a one or more particular functions. The phrase "capable of" as used herein is a recognition of the fact that some functions described for the various parts of the disclosed apparatus are performed only when the apparatus is powered and/or in operation. Those in the art having the benefit of this disclosure will appreciate that the embodiments illustrated herein include a number of electronic or electro-mechanical parts that, to operate, require electrical power. Even when provided with power, some functions described herein only occur when in operation. Thus, at times, some embodiments of the apparatus of the invention are "capable of" performing the recited functions even when they are not actually performing them—i.e., when there is no power or when they are powered but not in operation.

The following are hereby incorporated by reference for the purposes indicated above as if set forth verbatim herein:

U.S. Provisional Patent Application Ser. No. 61/118,317, entitled "Continuous Surface Wave Analysis in 3D Data", filed Nov. 26, 2008, in the name of the inventors Claudio L. Strobbia and Anna Glushchenko, and commonly assigned herewith;

U.S. patent application Ser. No. 12/620,941, entitled "Continuous Adaptive Surface Wave Analysis for Three-Dimensional Seismic Data", filed Sep. 18, 2009, in the name of the inventors Claudio L. Strobbia and Anna Glushchenko, and commonly assigned herewith;

U.S. Ser. No. 11/829,551, entitled "Methods and Apparatus for Geophysical Exploration Via Joint Inversion", filed Jul. 27, 2007, in the name of the inventors Daniele Colombo and Michele de Stefano;

International Patent Application No. PCT/IT2006/000636, entitled "Method for Building Velocity Models for Pre-Stack Depth Migration via the Simultaneous Joint Inversion of Seismic, Gravity and Magnetotelluric Data", filed Apr. 9, 2006, in the name of the inventors Daniele Colombo and Michele de Stefano;

Bohlen T., et al., "1.5-D Inversion of lateral variation of Scholte Wave dispersion", 69 Geophysics, 330-344 (2004);

Dziewonski, A. M. & Hales A. L., "Numerical analysis of dispersive seismic waves," 11 *Methods in computational physics,* 271-295, (B. A. Bolt (ed) Academic Press 1972);

Foti S., & Strobbia C., "Some Notes on Model Parameters for Surface Wave Data Inversion", Proc. SAGEEP, Las Vegas, USA, 11 pp. (2002);

Grandjean, G. & A. Bitri, "2M-SASW: Multifold multichannel seismic inversion of local dispersion of Rayleigh waves in laterally heterogeneous subsurfaces: application to the Super-Sauze earthflow, France: Near Surface", 4 Geophysics, 367-375 (2006);

Hayashi K., & Suzuki H., "CMP cross-correlation analysis of multi-channel surface-wave data", 35 Exploration Geophysics 7-13 (2004);

Ross W. S., et al., "Characterization of spatially varying surface waves in a land seismic survey," SEG Expanded abstract (2008);

Shapiro N. M., et al., "High-Resolution Surface-Wave Tomography from Ambient Seismic Noise," 307 (5715) *Science* 1615-1618 (2005);

Socco L. V. & Strobbia C., "Surface-wave method for near-surface characterization: a tutorial, Near Surface Geophysics," 165-185 (2004);

Strobbia C. & Foti S., "Multi-offset phase analysis of surface wave data (MOPA)," 59/4 Journal of Applied Geophysics, 300-313 (2006);

Strobbia C., et al., Surface waves: use them then lose them, Proc 71$^{st}$ EAGE Conference and Exhibition, 2009

Strobbia C., et al, Surface waves: processing, inversion and removal, First Break, 28, 63-69, (2010)

Xia J., et al., "Estimation of near-surface shear wave velocity by inversion of Rayleigh waves", 64 Geophysics 691-700 (1999).

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A computer-implemented method for use in exploring a subsurface geological formation, comprising:
    extracting surface wave and refracted wave properties from a set of seismic data representing the subsurface geological formation, wherein:
        the extracted surface wave properties are selected from the group consisting of dispersion of surface wave modes, their attenuation and frequency response, and
        the extracted refracted wave properties are selected from the group consisting of travel time for a pair of source and detector, amplitude information and wavelet information;
    simultaneously and jointly inverting the extracted surface wave and refracted wave properties to estimate visco-elastic shear and compressional parameters in the near surface, wherein simultaneously and jointly inverting the extracted surface wave and refracted wave properties comprises determining a near surface model by inverting the extracted surface wave and refracted wave properties using a single cost function.

2. The computer-implemented method of claim 1, wherein the extracted surface wave properties include the dispersion of the surface wave modes, their attenuation and frequency response.

3. The computer-implemented method of claim 1, wherein the extracted refracted wave properties include the travel time for each pair of source and detector, the amplitude information, and the wavelet information.

4. The computer-implemented method of claim 1, wherein extracting the surface wave and refracted wave properties includes extracting first break travel times for source-detector pairs in a survey and estimation of modal dispersion curves for all locations within the survey area simultaneously.

5. The computer-implemented method of claim 1, wherein extracting the surface wave and refracted wave properties includes:
    identifying the respective wave properties to be refracted; and
    performing single domain inversions of the extracted wave properties.

6. The computer-implemented method of claim 5, wherein simultaneously and jointly inverting the extracted surface wave and refracted wave properties includes:
    parameterizing the simultaneous joint inversion; and
    performing the simultaneous joint inversion.

7. The computer-implemented method of claim 1, wherein simultaneously and jointly inverting the extracted surface wave and refracted wave properties includes:
    parameterizing the simultaneous joint inversion; and
    performing the simultaneous joint inversion.

8. The computer-implemented method of claim 1, wherein extracting the surface wave and refracted wave properties includes:
    processing the seismic data in the surface wave domain, including:
        selecting a set of shot gathers spanning a large offset range;
        classifying near surface modes in the selected set of shot gathers;
        identifying events in the classified near surface modes; and
        extracting dispersion and attenuation curves for different surface wave modes present in the seismic data, and
    processing the seismic data in the refracted wave domain, including:
        pre-processing and conditioning the seismic data; and
        extracting a first break travel-time, peak amplitude, and spectral properties of a wavelet for all source-detector pairs generating the seismic data.

9. The computer-implemented method of claim 8, wherein simultaneously and jointly inverting the extracted surface wave and refracted wave properties includes:
    determining geometries of simultaneous and joint inversion iterations from the extracted surface wave and refracted wave properties; and
    performing a simultaneous joint inversion to extract a near surface model.

10. A non-transitory program storage medium encoded with instructions that, when executed by a computing device, perform a computer-implemented method for use in exploring a subsurface geological formation, the computer-implemented method comprising:

extracting surface wave and refracted wave properties from a set of seismic data representing the subsurface geological formation, wherein:
the extracted surface wave properties are selected from the group consisting of dispersion of surface wave modes, their attenuation and frequency response, and
the extracted refracted wave properties are selected from the group consisting of travel time for a pair of source and detector, amplitude information and wavelet information; and
simultaneously and jointly inverting the extracted surface wave and refracted wave properties to estimate visco-elastic shear and compressional parameters in the near surface, wherein simultaneously and jointly inverting the extracted surface wave and refracted wave properties comprises determining a near surface model by inverting the extracted surface wave and refracted wave properties using a single cost function.

11. The program storage medium of claim 10, wherein simultaneously and jointly inverting the extracted surface wave and refracted wave properties includes:
parameterizing the simultaneous joint inversion; and performing the simultaneous joint inversion.

12. The program storage medium of claim 10, wherein extracting the surface wave and refracted wave properties includes:
processing the seismic data in the surface wave domain, including:
selecting a set of shot gathers spanning a large offset range;
classifying near surface modes in the set of selected shot gathers;
identifying events in the classified near surface modes; and
extracting dispersion and attenuation curves for different surface wave modes present in the seismic data, and
processing the seismic data in the refracted wave domain, including:
pre-processing and conditioning the seismic data; and
extracting a first break travel-time, peak amplitude, and spectral properties of a wavelet for all source-detector pairs generating the seismic data.

13. A programmed computing apparatus, comprising:
a computing device;
a storage communicating with the computing device;
a software component residing on the storage that, when executed by the computing device, performs a method for use in exploring a subsurface geological formation, the method comprising:
extracting surface wave and refracted wave properties from a set of seismic data representing the subsurface geological formation, wherein:
the extracted surface wave properties are selected from the group consisting of dispersion of surface wave modes, their attenuation and frequency response, and
the extracted refracted wave properties are selected from the group consisting of travel time for a pair of source and detector, amplitude information and wavelet information; and
simultaneously and jointly inverting the extracted surface wave and refracted wave properties to estimate visco-elastic shear and compressional parameters in the near surface, wherein simultaneously and jointly inverting the extracted surface wave and refracted wave properties comprises determining a near surface model by inverting the extracted surface wave and refracted wave properties using a single cost function.

14. The programmed computing apparatus of claim 13, wherein simultaneously and jointly inverting the extracted surface wave and refracted wave properties includes:
parameterizing the simultaneous joint inversion; and
performing the simultaneous joint inversion.

15. The programmed computing apparatus of claim 13, wherein extracting the surface wave and refracted wave properties includes:
processing the seismic data in the surface wave domain, including:
selecting a set of shot gathers spanning a large offset range;
classifying near surface modes in the selected set of shot gathers;
identifying events in the classified near surface modes; and
extracting dispersion and attenuation curves for different surface wave modes present in the seismic data, and
processing the seismic data in the refracted wave domain, including:
pre-processing and conditioning the seismic data; and
extracting a first break travel-time, peak amplitude, and spectral properties of a wavelet for all source-detector pairs generating the seismic data.

16. The programmed computing apparatus of claim 13, wherein the computing apparatus comprises a computing system.

17. A computer-implemented method for modeling near surface features of a subsurface geological formation, comprising:
processing a set of seismic data independently in a surface wave domain and a refracted wave domain, wherein:
the independent processing in the surface wave domain includes extracting a surface wave property selected from the group consisting of dispersion of surface wave modes, their attenuation and frequency response, and
the independent processing in the refracted wave domain includes extracting a refracted wave property selected from the group consisting of travel time for a pair of source and detector, amplitude information and wavelet information; and
simultaneously and jointly inverting the results of the independent processing in the surface wave domain and the refracted wave domain to obtain a model of the near surface, wherein simultaneously and jointly inverting the extracted surface wave and refracted wave properties comprises determining a near surface model by inverting the extracted surface wave and refracted wave properties using a single cost function.

18. A computer-implemented method for modeling near surface features of a subsurface geological formation, comprising:
performing a pair of independent, single domain inversions of a seismic data set including a surface wave property and a refracted wave property, yielding a pair of independent inverted models;
performing a simultaneous and joint inversion of the seismic data set, using the independent inverted models to parameterize the simultaneous and joint inversion and obtain a near surface model, wherein performing the simultaneous and joint inversion comprises determining the near surface model by inverting the surface wave property and the refracted wave property using a single cost function.

19. The method of claim 1, further comprising separately inverting the surface wave and refracted wave properties to generate a surface wave model and a refracted wave model, respectively, wherein simultaneously and jointly inverting comprises using the surface wave model and the refracted wave model to parameterize a simultaneous and joint inversion of the surface wave and refracted wave properties.

* * * * *